(12) United States Patent
Kim et al.

(10) Patent No.: US 11,380,490 B2
(45) Date of Patent: Jul. 5, 2022

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Dong Hun Kim, Suwon-si (KR); Hyun Min Lee, Suwon-si (KR); Jong Suk Jeong, Suwon-si (KR); Dong Geon Yoo, Suwon-si (KR); Ji Hyun Lee, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 38 days.

(21) Appl. No.: 16/877,902

(22) Filed: May 19, 2020

(65) Prior Publication Data
US 2021/0166881 A1 Jun. 3, 2021

(30) Foreign Application Priority Data
Nov. 29, 2019 (KR) ......................... 10-2019-0156838

(51) Int. Cl.
*H01G 4/30* (2006.01)
*H01G 4/012* (2006.01)
(Continued)

(52) U.S. Cl.
CPC .............. *H01G 4/30* (2013.01); *H01G 4/012* (2013.01); *H01G 4/1227* (2013.01); *H01G 4/248* (2013.01)

(58) Field of Classification Search
CPC ........ H01G 4/012; H01G 4/1227; H01G 4/33; H01G 4/248; H01G 4/0085; H01G 4/232; H01G 4/30
See application file for complete search history.

(56) References Cited

U.S. PATENT DOCUMENTS

2014/0185185 A1 7/2014 Okajima et al.
2014/0311789 A1* 10/2014 Han .................. H01G 4/12
174/260

(Continued)

FOREIGN PATENT DOCUMENTS

JP S61-248413 A 11/1986
JP 09260206 A * 10/1997
(Continued)

*Primary Examiner* — Michael P McFadden
(74) *Attorney, Agent, or Firm* — Morgan, Lewis & Bockius LLP

(57) ABSTRACT

A multilayer ceramic capacitor includes a ceramic body including a dielectric layer, a plurality of first and second internal electrodes disposed inside the ceramic body, exposed to the first and second surfaces, and having ends exposed to the third or fourth surface, and a first side margin portion and a second side margin portion disposed on side portions of the plurality of first and second internal electrodes exposed to the first and second surfaces. A ratio Db/Da satisfies 1.00 to 1.07, inclusive, where 'Db' is a distance, in a stacking direction of the dielectric layer, between both end points of respective edge regions of the first side margin portion and the second side margin portion, and 'Da' is a distance in a central region of the ceramic body in the stacking direction.

9 Claims, 7 Drawing Sheets

(51) Int. Cl.
*H01G 4/248* (2006.01)
*H01G 4/12* (2006.01)

(56) References Cited

U.S. PATENT DOCUMENTS

| | | | | |
|---|---|---|---|---|
| 2015/0136462 A1* | 5/2015 | Lee | ...................... | H01G 4/012 |
| | | | | 174/260 |
| 2017/0162330 A1* | 6/2017 | Kan | ...................... | H01G 4/12 |
| 2018/0166217 A1* | 6/2018 | Kato | ...................... | H01G 4/30 |
| 2018/0374645 A1* | 12/2018 | Imai | ...................... | H01G 4/385 |

FOREIGN PATENT DOCUMENTS

| | | |
|---|---|---|
| JP | H09-260206 A | 10/1997 |
| JP | 2014-143392 A | 8/2014 |
| JP | 2014-216643 A | 11/2014 |
| KR | 10-2010-0136917 A | 12/2010 |

\* cited by examiner

MULTILAYER CERAMIC CAPACITOR AND METHOD OF MANUFACTURING THE SAME

CROSS-REFERENCE TO RELATED APPLICATION(S)

The present application claims the benefit of priority to Korean Patent Application No. 10-2019-0156838 filed on Nov. 29, 2019 in the Korean Intellectual Property Office, the entire disclosure of which is incorporated herein by reference.

BACKGROUND

1. Field

The present disclosure relates to a multilayer ceramic capacitor in which moisture resistance reliability may be improved, and at the same time, withstand voltage may be improved, and a method of manufacturing the same.

2. Description of Related Art

In general, electronic components using a ceramic material, such as capacitors, inductors, piezoelectric elements, varistors, or thermistors, include a ceramic body formed of a ceramic material, an internal electrode formed inside the body, and an external electrode disposed on the surface of the ceramic body to be connected to the internal electrode.

Recently, as electronic products have been miniaturized and multifunctionalized, chip components have been also miniaturized and highly functionalized. Therefore, multilayer ceramic capacitors are required to have high capacity with small sizes.

As described above, it is essential to secure reliability and high withstand voltage characteristics for small and high capacity products.

Miniaturization and high capacitance of multilayer ceramic capacitors require significantly increasing the effective electrode area (increasing the effective volume fraction required for capacitance implementation).

To implement a small and high capacity multilayer ceramic capacitor as described above, in manufacturing a multilayer ceramic capacitor, the internal electrode may be exposed in the width direction of the body, thereby significantly increasing the internal electrode area in the width direction through a marginless design. For example, in the pre-firing stage, after manufacturing such a chip, a method of separately attaching a side margin portion to the widthwise electrode exposed surface of the chip to complete a multilayer ceramic capacitor is applied.

However, in the process of forming the side margin portion in the above method, voids increase in the side margin portion, and moisture may penetrate through the voids, thereby decreasing the moisture resistance reliability.

Increasing the firing temperature to remove the voids may cause a problem in which the withstand voltage may be lowered due to the overfiring of the internal electrode adjacent to the side margin portion.

Therefore, there is a need for research to improve the reliability of moisture resistance and secure high BDV in ultra-small and high-capacity products.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer ceramic capacitor in which moisture resistance reliability may be improved, and at the same time, withstand voltage may be improved, and a method of manufacturing the same.

According to an aspect of the present disclosure, a multilayer ceramic capacitor includes a ceramic body including a dielectric layer, the ceramic body having first and second surfaces opposing each other, third and fourth surfaces connecting the first and second surfaces, and fifth and sixth surfaces connected to the first to fourth surfaces and opposing each other, a plurality of first and second internal electrodes disposed inside the ceramic body, exposed to the first and second surfaces, and having ends exposed to the third or fourth surface, and a first side margin portion and a second side margin portion disposed on side portions of the plurality of first and second internal electrodes exposed to the first and second surfaces, respectively. A ratio Db/Da satisfies 1.00 to 1.07, inclusive, where 'Db' is a distance, in a stacking direction of the dielectric layer, between both end points of respective edge regions of the first side margin portion and the second side margin portion, and 'Da' is a distance in a central region of the ceramic body in the stacking direction.

According to an aspect of the present disclosure, a method of manufacturing a multilayer ceramic capacitor includes preparing a first ceramic green sheet on which a plurality of first internal electrode patterns are formed at a predetermined interval and a second ceramic green sheet on which a plurality of second internal electrode patterns are formed at a predetermined interval, laminating the first ceramic green sheet and the second ceramic green sheet in such a manner that the plurality of first internal electrode patterns and the plurality of second internal electrode patterns intersect each other, to form a ceramic green sheet laminated body, cutting the ceramic green sheet laminated body to have side surfaces to which edges of the plurality of first internal electrode patterns and the plurality of second internal electrode patterns are exposed in a width direction, forming a first side margin portion and a second side margin portion on the side surfaces of the laminated body, respectively, and firing the cut laminated body to provide a ceramic body including a dielectric layer and first and second internal electrodes. A ratio Db/Da satisfies 1.00 to 1.07, inclusive, where 'Db' is a distance, in a stacking direction of the first and second ceramic green sheets, between both end points of respective edge regions of the first side margin portion and the second side margin portion, and 'Da' is a distance in a central region of the ceramic body in the stacking direction.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
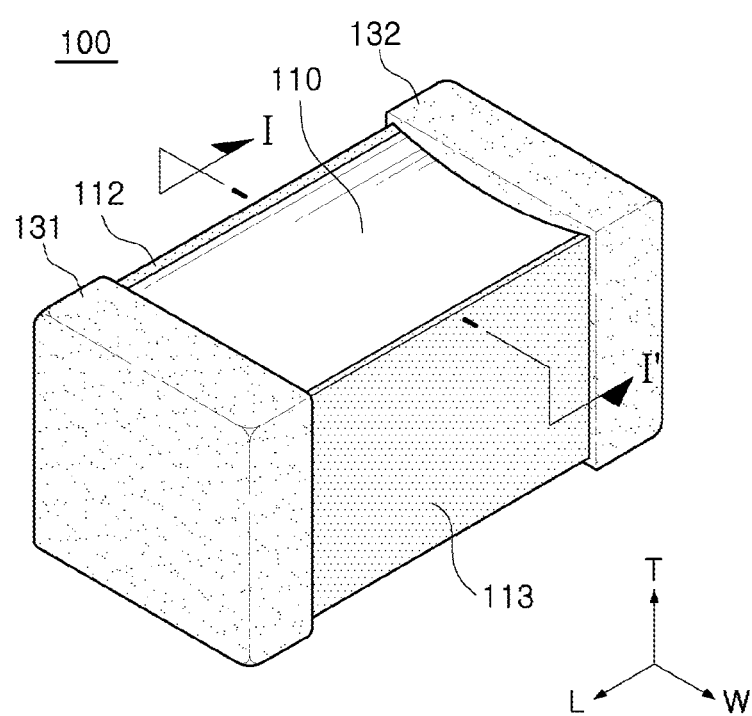
FIG. 1 is a schematic perspective view illustrating a multilayer ceramic capacitor according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

FIG. 1 is a schematic perspective view illustrating a multilayer ceramic capacitor according to an exemplary embodiment.

Figure 2:
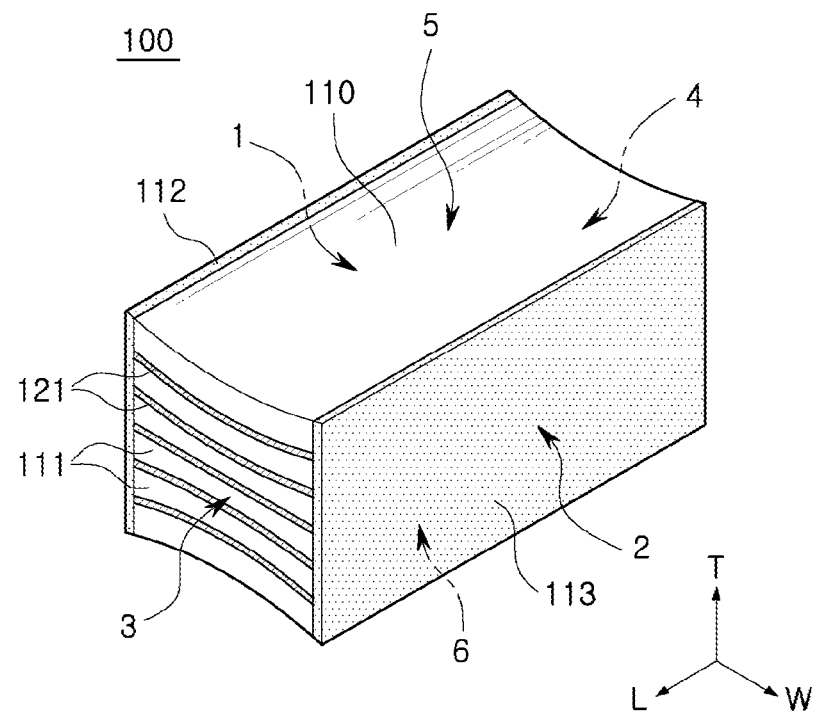
FIG. 2 is a perspective view illustrating an exterior of a ceramic body of FIG. 1.

FIG. 2 is a perspective view illustrating an exterior of a ceramic body of FIG. 1.

Figure 3:
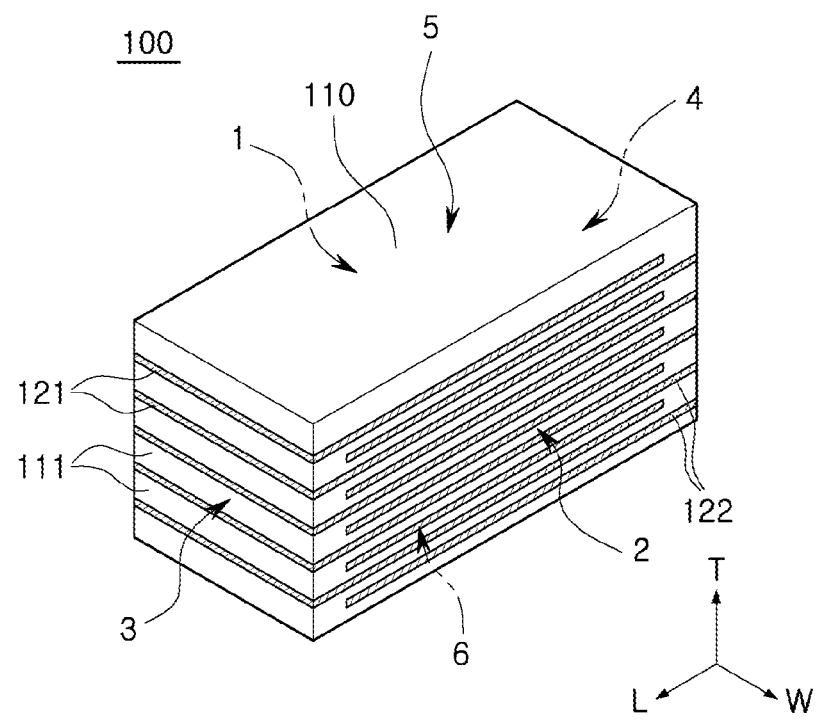
FIG. 3 is a perspective view illustrating a ceramic green sheet laminated body before firing of the ceramic body of FIG. 2.

FIG. 3 is a perspective view illustrating a ceramic green sheet laminated body before firing of the ceramic body of FIG. 2.

Figure 4:
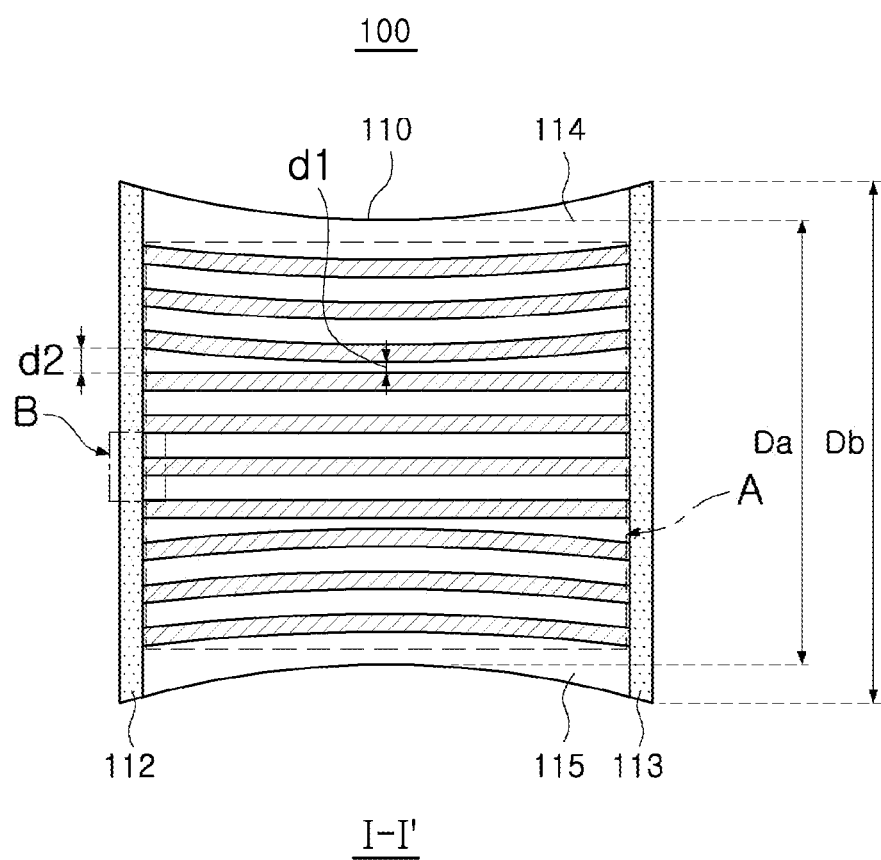
FIG. 4 is a cross-sectional view taken along line I-I' of FIG. 1.

FIG. 4 is a cross-sectional view taken along line I-I' of FIG. 1.

Referring to FIGS. 1 to 4, a multilayer ceramic capacitor 100 according to an exemplary embodiment includes a ceramic body 110, a plurality of internal electrodes 121 and 122 formed in the ceramic body 110, and external electrodes 131 and 132 formed on external surfaces of the ceramic body 110.

The ceramic body 110 may have a first surface 1 and a second surface 2 opposing each other, a third surface 3 and a fourth surface 4 connecting the first and second surfaces, and a fifth surface 6 and a sixth surface 6, which are an upper surface and a lower surface.

The first surface 1 and the second surface 2 may be surfaces opposing each other in the width direction as a second direction of the ceramic body 110, and the third surface 3 and the fourth surface 4 may be surfaces opposing each other in the longitudinal direction as a first direction, and the fifth surface 5 and the sixth surface 6 may be surfaces opposing each other in the thickness direction as a third direction.

The shape of the ceramic body 110 is not particularly limited, but may be a rectangular parallelepiped shape as illustrated in the drawings.

One ends of the plurality of internal electrodes 121 and 122 formed in the ceramic body 110 are exposed to the third surface 3 or the fourth surface 4 of the ceramic body.

The internal electrodes 121 and 122 may be provided as a pair of first internal electrode 121 and second internal electrode 122 having different polarities.

One end of the first internal electrode 121 may be exposed to the third surface 3, and one end of the second internal electrode 122 may be exposed to the fourth surface 4.

The other ends of the first internal electrode 121 and the second internal electrode 122 are formed at a predetermined interval from the third surface 3 or the fourth surface 4.

First and second external electrodes 131 and 132 may be formed on the third surface 3 and the fourth surface 4 of the ceramic body to be electrically connected to the internal electrodes.

The multilayer ceramic capacitor 100 according to an exemplary embodiment includes a plurality of internal electrodes 121 and 122 disposed inside the ceramic body 110, exposed to the first and second surfaces 1 and 2 and having one ends exposed to the third or fourth surface 4, and a first side margin portion 112 and a second side margin portion 113 disposed on side portions of the internal electrodes 121 and 122 exposed on the first surface 1 and the second surface 2.

A plurality of the internal electrodes 121 and 122 are formed in the ceramic body 110, and respective side portions of the plurality of internal electrodes 121 and 122 are exposed to the first surface and the second surface, which are surfaces of the ceramic body 110 in the width direction. The first side margin portion 112 and the second side margin portion 113 are disposed on the exposed side portions of the first internal electrodes 121 and 122.

An average thickness of the first side margin portion 112 and the second side margin portion 113 may be 10 μm or more and less than 45 μm.

According to an exemplary embodiment, the ceramic body 110 may be comprised of a laminate in which a plurality of dielectric layers 111 are stacked, and the first side margin portion 112 and the second side margin portion 113 disposed on both sides of the laminate.

The plurality of dielectric layers 111 may be in a sintered state and may be integrated such that boundaries between adjacent dielectric layers cannot be identified.

The length of the ceramic body 110 corresponds to the distance from the third surface 3 to the fourth surface 4 of the ceramic body.

The length of the dielectric layer 111 forms the distance between the third face 3 and the fourth face 4 of the ceramic body.

According to an exemplary embodiment, the length of the ceramic body may be 400 to 1400 μm, and in detail, the length of the ceramic body may be 400 to 800 μm or 600 to 1400 μm, but is not limited thereto.

The internal electrodes 121 and 122 may be formed on the dielectric layer 111, and the internal electrodes 121 and 122 may be formed in the ceramic body with one dielectric layer interposed therebetween by sintering.

Referring to FIG. 3, the first internal electrode 121 is formed on the dielectric layer 111. The first internal electrode 121 is not formed entirely in the longitudinal direction of the dielectric layer. For example, one end of the first internal electrode 121 is formed to the third surface 3 to be exposed to the third surface 3, and the other end of the first internal electrode 121 may be formed at a predetermined interval from the fourth surface 4 of the ceramic body.

The end portion of the first internal electrode exposed to the third surface 3 of the ceramic body is connected to the first external electrode 131.

In contrast to the first internal electrode, one end of the second internal electrode 122 is exposed to the fourth surface 4 to be connected to the second external electrode 132, and the other end of the second internal electrode 122 is formed at a predetermined interval from the third surface 3.

The internal electrodes may be stacked in an amount of 400 or more layers to implement a high capacitance multilayer ceramic capacitor, but an embodiment thereof is not limited thereto.

The dielectric layer 111 may have the same width as that of the first internal electrode 121. For example, the first internal electrode 121 may be formed entirely in the width direction of the dielectric layer 111.

According to an exemplary embodiment, the width of the dielectric layer and the width of the internal electrode may be 100 to 900 μm, but are not limited thereto. In detail, the width of the dielectric layer and the width of the internal electrode may be 100 to 500 μm, or 100 to 900 μm.

The ceramic body 110 may include an active portion A as a part contributing to the capacitance formation of the capacitor, and upper and lower cover portions 114 and 115 formed on upper and lower portions of the active portion A as upper and lower margin portions, respectively.

The active portion A may be formed by repeatedly stacking the plurality of first and second internal electrodes 121 and 122 with the dielectric layer 111 interposed therebetween.

The upper and lower cover portions 114 and 115 may have the same material and configuration as those of the dielectric layer 111 except for not including internal electrodes.

For example, the upper and lower cover portions 114 and 115 may include a ceramic material, for example, a barium titanate (BaTiO$_3$)-based ceramic material.

The upper and lower cover portions 114 and 115 may each have a thickness of 20 μm or less, but are not necessarily limited thereto.

According to an exemplary embodiment, to improve the moisture resistance reliability and secure high BDV in ultra-small and high-capacity products, the present disclosure may be characterized in that the ratio of a stacking direction distance in a central region of the ceramic body and a distance between both end points of respective edge regions of the first side margin portion and the second side margin portion in the stacking direction of the ceramic body is controlled.

For example, as an exemplary embodiment of the present disclosure, in the case in which the upper and lower cover portions 114 and 115 each have a thickness of 20 μm or less, there may be a problem of deterioration in moisture resistance, while in the case of the related art in which the thickness of the upper and lower cover portions is more than 20 μm, there is no problem of moisture resistance reliability due to the thickness of the cover portion.

In an exemplary embodiment, the internal electrode and the dielectric layer are formed by being cut at the same time, and the width of the internal electrode and the width of the dielectric layer may be the same, which will be described in more detail below.

To significantly increase the capacity of a multilayer ceramic capacitor, a method of thinning the dielectric layer, a method of high lamination of the thinned dielectric layer, a method of improving the coverage of the internal electrode, and the like may be considered.

In addition, a method of improving the area of overlap of the internal electrodes forming the capacitance may be considered.

To increase the area of overlap of the internal electrodes, the margin area in which the internal electrodes are not formed should be significantly reduced.

In detail, as the size of the multilayer ceramic capacitor is further reduced, the margin area should be significantly reduced to increase the area of overlap of the internal electrodes.

In general, to implement a small and high capacity multilayer ceramic capacitor, in manufacturing a multilayer ceramic capacitor, the internal electrode is exposed in the width direction of the body, thereby significantly increasing the internal electrode area in the width direction through a marginless design. For example, in the pre-firing stage, after manufacturing such a chip, a method of separately attaching a side margin portion to the widthwise electrode exposed surface of the chip to complete a multilayer ceramic capacitor is applied.

However, in the process of forming the side margin portions in the above method, the voids increase in the side margin portions, and moisture may penetrate through the voids, thereby decreasing the moisture resistance reliability.

Increasing the firing temperature to remove the voids may cause a problem in which the withstand voltage may be lowered due to the overfiring of the internal electrodes adjacent to the side margin portions.

According to an exemplary embodiment of the present disclosure, a ratio Db/Da of a distance Db between both end points of respective edge regions of the first side margin portion 112 and the second side margin portion 113 in the stacking direction of the ceramic body 110, relative to a stacking direction distance Da in a central region of the ceramic body 110, satisfies 1.00 to 1.07. The distances Da and Db may be measured by a standart method that will be apparent to and understood by one of ordinary skill in the art.

By controlling the ratio of the distance between the stacking direction distance in the central region of the ceramic body and the distance between the both end points of respective edge regions of the first side margin portion and the second side margin portion, the ultra-small and high-capacity multilayer ceramic capacitor may be implemented, and the withstand voltage may be improved simultaneously with improving moisture resistance reliability.

In detail, according to an exemplary embodiment of the present disclosure, an ultra-small and high-capacity multilayer ceramic capacitor, in which the thickness of the dielectric layer 111 is 0.6 µm or less and the thickness of the internal electrode 121, 122 is 0.4 µm or less, may be provided. The thicknesses of the dielectric layer 111 and the internal electrode 121, 122 may be measured by a standart method that will be apparent to and understood by one of ordinary skill in the art.

As in the embodiment, in the case of the ultra-small and high-capacity multilayer ceramic capacitor to which a dielectric layer and an internal electrode of a thin film are applied, in which the thickness of the dielectric layer 111 is 0.6 µm or less and the thickness of the internal electrode 121, 122 is 0.4 µm or less; the penetration of moisture into the side margin portion causing a decrease in moisture resistance is a significantly important issue.

For example, in an exemplary embodiment of the present disclosure, since the technology in which the dielectric layer 111 has a thickness of 0.6 µm or less, and the internal electrodes 121 and 122 have a thickness of 0.4 µm or less is applied to the ultra-small and high-capacity multilayer ceramic capacitor, the thickness of the dielectric layer and the internal electrode may be relatively thin, and thus, there is a possibility that the reliability of moisture resistance due to moisture infiltration may be lowered.

However, in an ultra-small and high-capacity multilayer ceramic capacitor having a separate side margin portion as in an exemplary embodiment of the present disclosure, the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110, may be controlled to satisfy 1.00 to 1.07. Therefore, even in the case of a thin film having the thickness of the dielectric layer 111 of 0.6 µm or less and the thickness of the internal electrodes 121 and 122 being 0.4 µm or less, the moisture resistance reliability may be improved, and the withstand voltage characteristics may also be improved.

However, the meaning of the thin film does not necessarily mean that the thickness of the dielectric layer 111 is 0.6 µm or less, and that the thickness of the internal electrodes 121 and 122 is 0.4 µm or less, and may be understood to include a dielectric layer and an internal electrode having a thickness thinner than that of a related art product.

Although a method of adjusting the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 to satisfy 1.00 to 1.07 is not particularly limited; for example, the dielectric material and composition for the formation of the first side margin portion 112 and the second side margin portion 113 may be implemented to be different from the dielectric material and composition for the formation of the dielectric layer 111 of the active portion A.

For example, in the related art, since the dielectric material and composition for forming the side margin portions are the same as the dielectric material and composition for forming the dielectric layer of the active portion, voids are formed in the side margin portions during firing, and thus there is a problem in which moisture resistance is relatively low.

In addition, when the firing temperature is increased to remove the side margin portion voids to improve the moisture resistance, the withstand voltage of the multilayer ceramic capacitor is lowered.

However, according to an exemplary embodiment of the present disclosure, the dielectric material and composition for forming the first side margin portion 112 and the second side margin portion 113 may be applied differently from the dielectric material and composition for forming the dielectric layer 111 of the active portion A, thereby obtaining both effects of improving the moisture resistance reliability and improving the withstand voltage characteristics.

For example, the content of the binder included in the dielectric material for forming the first side margin portion 112 and the second side margin portion 113 may be different from the binder included in the dielectric material for forming the dielectric layer 111 of the active portion A, thereby implementing the feature according to an exemplary embodiment of the present disclosure.

The higher the binder content is, the greater the shrinkage rate upon firing is, and conversely, the lower the binder content is, the lower the shrinkage rate is.

Therefore, in the case in which the content of the binder included in the dielectric material for forming the first side margin portion 112 and the second side margin portion 113 is less than the content of the binder included in the dielectric material for forming the dielectric layer 111 of the active portion A, the shrinkage of the side margin portion during the firing process is lower than that of the dielectric layer of the active portion, so that the above-described features may be implemented according to an exemplary embodiment.

For example, referring to FIG. 4, the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 satisfies 1.00 to 1.07. In this case, the edge regions of the first side margin portion 112 and the second side margin portion 113 have a protruding shape, compared to the central region of the ceramic body 110.

As the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 satisfies 1.00 to 1.07; both the effects of improving the moisture resistance reliability and improving the withstand voltage characteristics may be obtained.

A case in which the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 is less than 1.00 is the related art case. In this case, the central portion of the ceramic body has a shape protruding upwardly, compared to the edge portions of the side margins. In this case, the distance between the end portions of the internal electrodes is relatively short, so that the withstand voltage characteristics are deteriorated, and the high temperature load characteristics are deteriorated.

If the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 is more than 1.07, the contraction degree of the side margin portions is relatively small, and the protrusions of the edge regions of the side margin portions are deepened, so that the external electrode uncoated region may be formed or the thickness of the external electrode coating layer may be reduced, thereby deteriorating moisture resistance.

In more detail, according to an exemplary embodiment of the present disclosure, as the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 satisfies more than 1.00 and 1.07 or less; both the effects of improving the moisture resistance reliability and improving the withstand voltage characteristics may be obtained.

For example, in the case in which the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 is 1.00, it may be difficult to implement an actual product, and when Db/Da exceeds 1.00 as in the embodiment, the effect may be increased.

Referring to FIG. 4, in the multilayer ceramic capacitor according to the exemplary embodiment, a ratio $d_2/d_1$ of an interval $d_2$ between the first internal electrode 121 and the second internal electrode 122 in the end portions of the ceramic body 110, relative to an interval $d_1$ between the first internal electrode 121 and the second internal electrode 122 in the central region of the ceramic body 110, may satisfy more than 1.00 and less than or equal to 1.05. Therefore, as the interval $d_2$ between the first internal electrode 121 and the second internal electrode 122 in the end portions of the ceramic body 110 increases, an electric field concentration relaxation effect may be obtained, and the breakdown voltage (BDV) may increase. The intervals $d_1$ and $d_2$ may be measured by a standart method that will be apparent to and understood by one of ordinary skill in the art.

In a general multilayer ceramic capacitor, the interval between the first internal electrode and the second internal electrode in the end portion of the ceramic body becomes smaller than a distance between the first internal electrode and the second internal electrode in the central region of the ceramic body due to the pressing process of the ceramic body.

In this case, as the interval between the first internal electrode and the second internal electrode is narrowed in the end portion of the ceramic body, an electric field is concentrated, and thus, a breakdown voltage (BDV) is lowered.

According to an exemplary embodiment of the present disclosure, as the shrinkage ratio of the side margin portion is controlled to be lower than the shrinkage ratio of the dielectric layer of the active portion during the firing process, the interval $d_2$ between the first internal electrode 121 and the second internal electrode 122 in the end portion of the ceramic body 110 may be greater than the interval $d_1$ between the first internal electrode 121 and the second internal electrode 122 in the central region of the ceramic body 110. Therefore, the concentration of the electric field between the first internal electrode and the second internal electrode in the end portions of the ceramic body may be alleviated.

For this reason, in the multilayer ceramic capacitor according to the exemplary embodiment, a breakdown voltage (BDV) may increase, thereby improving reliability.

If the ratio $d_2/d_1$ of the interval $d_2$ between the first internal electrode 121 and the second internal electrode 122 in the end portion of the ceramic body 110, relative to the interval $d_1$ between the first internal electrode 121 and the second internal electrode 122 in the central region of the ceramic body 110, is 1.00 or less, the breakdown voltage (BVV) may decrease due to the concentration of the electric field between the internal electrodes in the end portion of the ceramic body.

If the ratio $d_2/d_1$ of the interval $d_2$ between the first internal electrode 121 and the second internal electrode 122 in the end portion of the ceramic body 110, relative to the interval $d_1$ between the first internal electrode 121 and the second internal electrode 122 in the central region of the ceramic body 110, exceeds 1.05, the moisture resistance reliability may be deteriorated.

Figure 5:
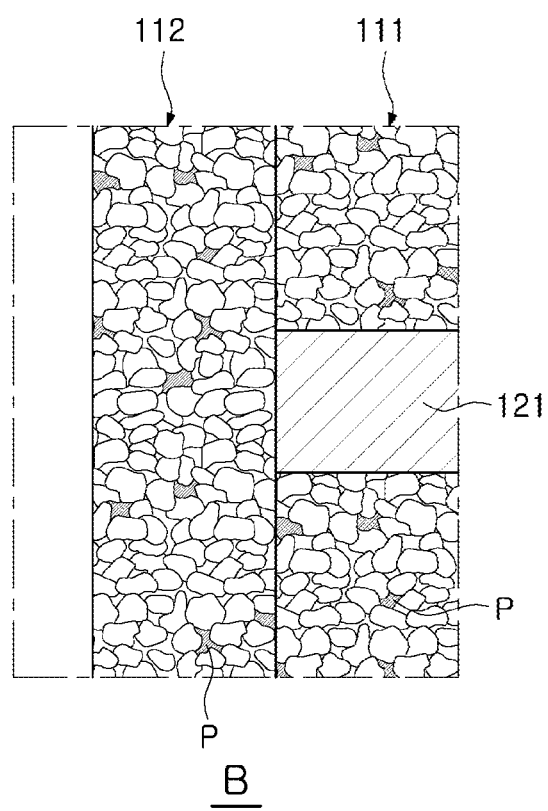
FIG. 5 is an enlarged view of region B of FIG. 4.

FIG. 5 is an enlarged view of region B of FIG. 4.

Referring to FIG. 5, the ratio of the number of pores in the first side margin portion 112 and the second side margin portion 113 to the number of pores in the dielectric layer 111 of the active portion A may satisfy 0.9 to 1.1.

According to an exemplary embodiment, the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110 satisfies 1.00 to 1.07, and the ratio of the number of pores in the first side margin portion 112 and the second side margin portion 113 to the number of pores in the dielectric layer 111 of the active portion A satisfies 0.9 to 1.1, thereby improving moisture resistance reliability and withstand voltage characteristics.

Although a method of controlling the ratio of the number of pores in the first side margin portion 112 and the second side margin portion 113 to the number of pores in the dielectric layer 111 of the active portion A to satisfy 0.9 to 1.1 is not particularly limited, for example, the method may be implemented by adjusting the particle size of the raw material of a ceramic powder introduced in the process of forming the dielectric layer 111 of the active portion A, the first side margin portion 112 and the second side margin portion 113.

For example, the particle diameter of the barium titanate ($BaTiO_3$) powder, a raw material for the formation of the dielectric layer 111 of the active portion A, may be greater than the particle diameter of the barium titanate ($BaTiO_3$) powder, a raw material for the formation of the first side margin portion 112 and the second side margin portion 113, the method of controlling the ratio of the number of pores as described above may be implemented.

Although not particularly limited, for example, the particle size of the barium titanate ($BaTiO_3$) powder, which is a raw material for forming the dielectric layer 111 of the active portion A, is about 100 nm, and the particle size of the barium titanate ($BaTiO_3$) powder, which is a raw material for the formation of the first side margin portion 112 and the second side margin portion 113, is be about 70 nm.

FIGS. 6A to 6F are cross-sectional views and perspective views schematically illustrating a method of manufacturing a multilayer ceramic capacitor according to another exemplary embodiment.

According to another exemplary embodiment, a method of manufacturing a multilayer ceramic capacitor includes preparing a first ceramic green sheet on which a plurality of first internal electrode patterns are formed at a predetermined interval and a second ceramic green sheet on which a plurality of second internal electrode patterns are formed at a predetermined interval, laminating the first ceramic green sheet and the second ceramic green sheet in such a manner that the first internal electrode patterns and the second internal electrode patterns intersect each other, to form a ceramic green sheet laminated body, cutting the ceramic green sheet laminated body to have side surfaces to which edges of the first internal electrode patterns and the second internal electrode patterns are exposed in a width direction, forming a first side margin portion and a second side margin portion on the side surfaces to which the edges of the first internal electrode patterns and the second internal electrode patterns are exposed, and firing the cut laminated body to provide a ceramic body including a dielectric layer and first and second internal electrodes. In this case, a ratio Db/Da of a distance Db between both end points of respective edge regions of the first side margin portion and the second side margin portion in a stacking direction of the ceramic body, relative to a stacking direction distance Da in a central region of the ceramic body, satisfies 1.00 to 1.07.

Hereinafter, a method of manufacturing a multilayer ceramic capacitor according to another exemplary embodiment will be described.

Figure 6A:
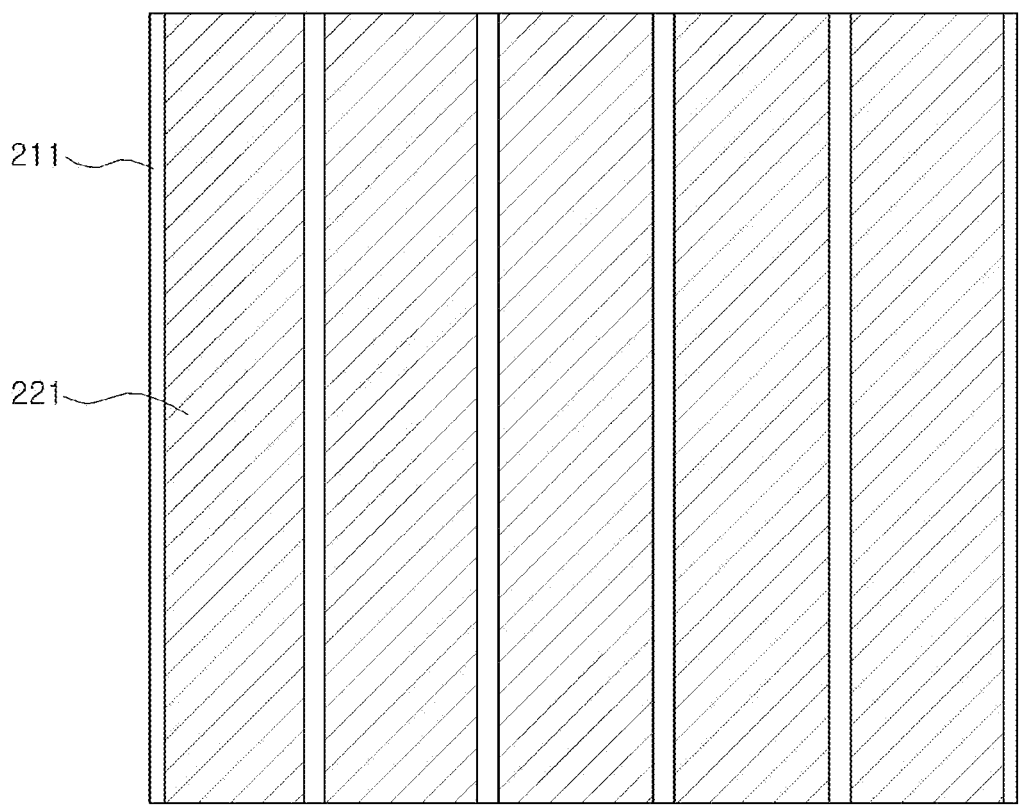
FIGS. 6A to 6F are cross-sectional views and perspective views schematically illustrating a method of manufacturing a multilayer ceramic capacitor according to another exemplary embodiment.

As illustrated in FIG. 6A, a plurality of stripe-type first internal electrode patterns 221 are formed on a ceramic green sheet 211 at a predetermined interval. The plurality of stripe-type first internal electrode patterns 221 may be formed in parallel to each other.

The ceramic green sheet 211 may be formed of a ceramic paste including a ceramic powder, an organic solvent, and an organic binder.

The ceramic powder is a material having a high dielectric constant and may be a barium titanate ($BaTiO_3$)-based material, a lead composite perovskite-based material, a strontium titanate ($SrTiO_3$)-based material or the like, but is not limited thereto. In detail, barium titanate ($BaTiO_3$)-based powder may be used. When the ceramic green sheet 211 is fired, the ceramic green sheet 211 becomes a dielectric layer 111 constituting the ceramic body 110.

The stripe-type first internal electrode patterns 221 may be formed by an internal electrode paste including a conductive metal. The conductive metal may be nickel (Ni), copper (Cu), palladium (Pd), or alloys thereof, but is not limited thereto.

The method of forming the stripe-type first internal electrode patterns 221 on the ceramic green sheet 211 is not particularly limited, but may be formed by, for example, a printing method such as a screen-printing method or a gravure printing method.

Although not illustrated, a plurality of stripe-type second internal electrode patterns 222 may be formed on the ceramic green sheet 211 at a predetermined interval.

Hereinafter, the ceramic green sheet on which the first internal electrode patterns 221 are formed may be referred to as a first ceramic green sheet, and the ceramic green sheet on which the second internal electrode patterns 222 are formed may be referred to as a second ceramic green sheet.

Figure 6B:
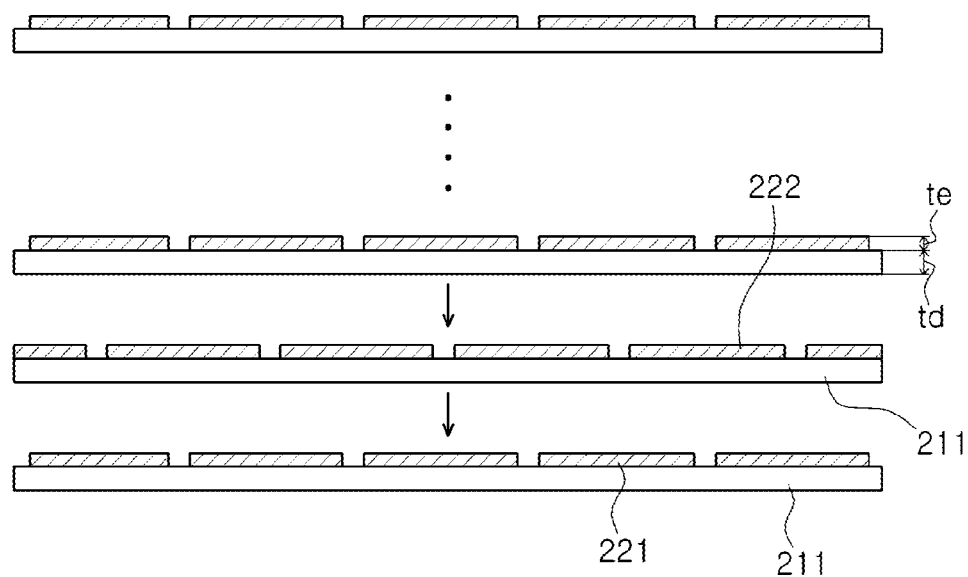

Next, as illustrated in FIG. 6B, the first and second ceramic green sheets may be alternately stacked in such a manner that the stripe-type first internal electrode patterns 221 and the stripe-type second internal electrode patterns 222 are alternately stacked.

Thereafter, the stripe-type first internal electrode pattern 221 may be a first internal electrode 121, and the stripe-type second internal electrode pattern 222 may be a second internal electrode 122.

According to another exemplary embodiment, a thickness td of each of the first and second ceramic green sheets is 1.0 μm or less, and a thickness to of each of the first and second internal electrode patterns is 0.5 μm or less.

Since an exemplary embodiment of the present disclosure is characterized by an ultra-small high-capacity multilayer ceramic capacitor having a thin film having a dielectric layer with the thickness of 0.6 μm or less and an internal electrode thickness of 0.4 μm or less, the thickness td of each of the first and second ceramic green sheets is 1.0 μm or less, and the thickness to of each of the first and second internal electrode patterns is 0.5 μm or less.

Figure 6C:
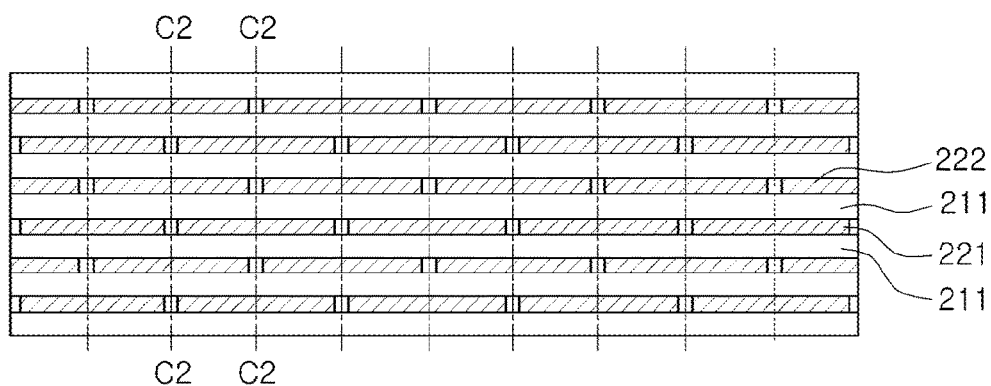
Figure 6D:
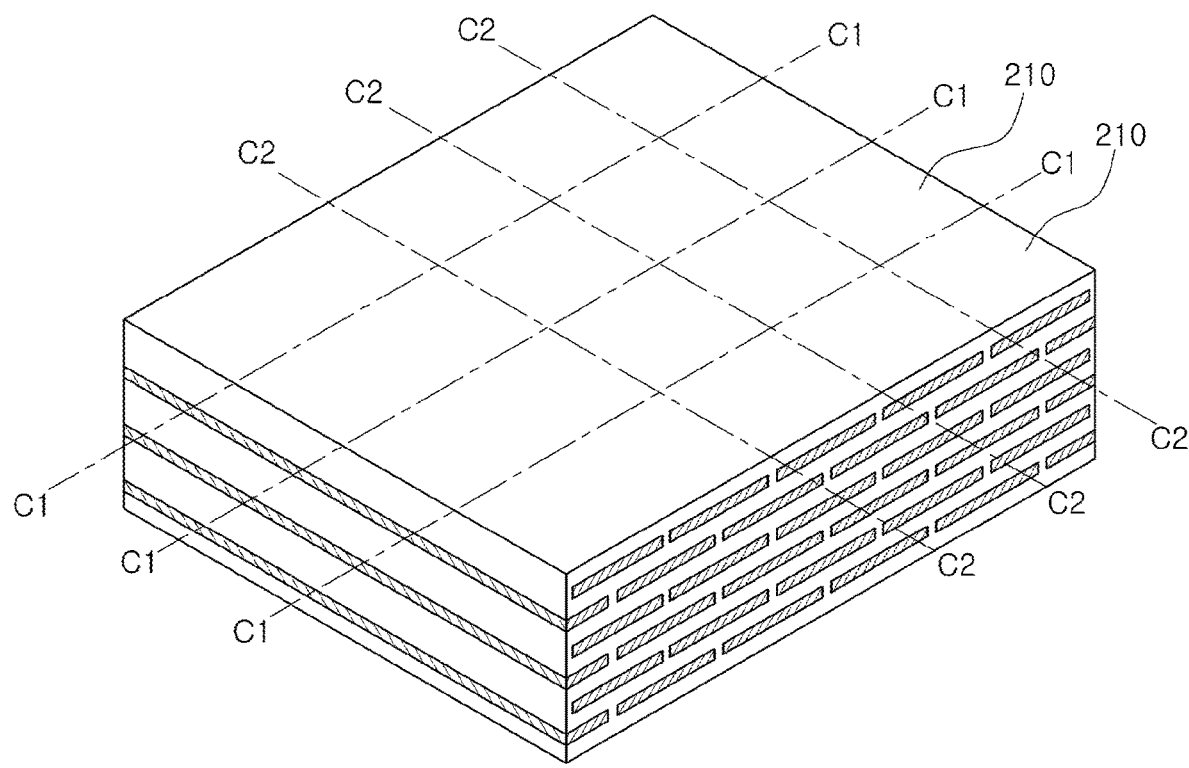

FIG. 6C is a cross-sectional view illustrating a ceramic green sheet laminated body 220 in which first and second ceramic green sheets are stacked according to an exemplary embodiment, and FIG. 6D is a perspective view illustrating the ceramic green sheet laminated body 220 in which the first and second ceramic green sheets are stacked.

Referring to FIGS. 6C and 6D, a first ceramic green sheet on which a plurality of parallel stripe-type first internal electrode patterns 221 are printed and a second ceramic green sheet on which a plurality of parallel stripe-type second internal electrode patterns 222 are printed are stacked alternately.

In detail, the first ceramic green sheet and the second ceramic green sheet may be stacked in such a manner that central portions of the stripe-type first internal electrode patterns 221 printed on the first ceramic green sheet and gaps between the stripe-type second internal electrode patterns 222 printed on the second ceramic green sheet overlap each other.

Next, as illustrated in FIG. 6D, the ceramic green sheet laminated body 220 may be cut across the plurality of stripe-type first internal electrode patterns 221 and the plurality of stripe-type second internal electrode patterns 222. For example, the ceramic green sheet laminated body 210 may become laminated bodies 210 provided by being cut along C1-C1 and C2-C2 cutting lines orthogonal to each other.

In more detail, the stripe-type first internal electrode patterns 221 and the stripe-type second internal electrode patterns 222 may be cut in the longitudinal direction and divided into a plurality of internal electrodes having a predetermined width. At this time, the laminated ceramic green sheets are also cut together with the internal electrode patterns. Accordingly, the dielectric layer may be formed to have the same width as that of the internal electrode.

The cutting may be performed to fit individual ceramic body sizes along the C2-C2 cutting line. For example, before forming the first side margin portion and the second side margin portion, a rod-shaped laminate may be cut into individual ceramic body sizes along the C2-C2 cutting line to form a plurality of laminated bodies 210.

For example, the rod-shaped laminate may be cut in such a manner that central portions of overlapping first internal electrodes and predetermined gaps formed between second internal electrodes are cut by the same cutting line. Accordingly, one ends of the first internal electrode and the second internal electrode may be alternately exposed on the cut surface.

Thereafter, a first side margin portion and a second side margin portion may be formed on first and second side surfaces of the laminated body 210.

Figure 6E:
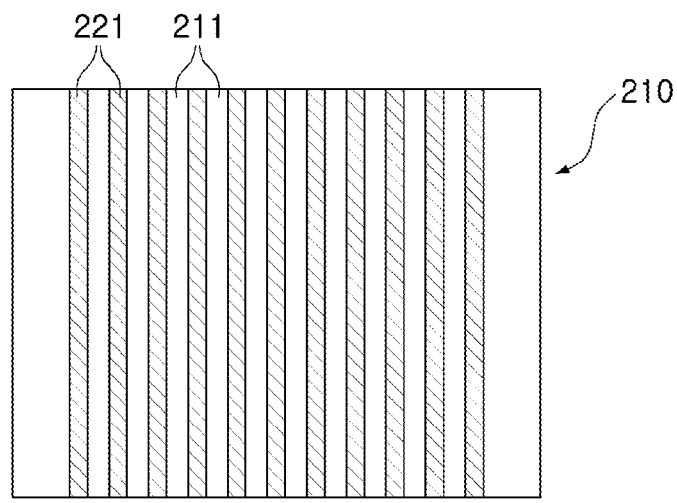
Figure 6E:
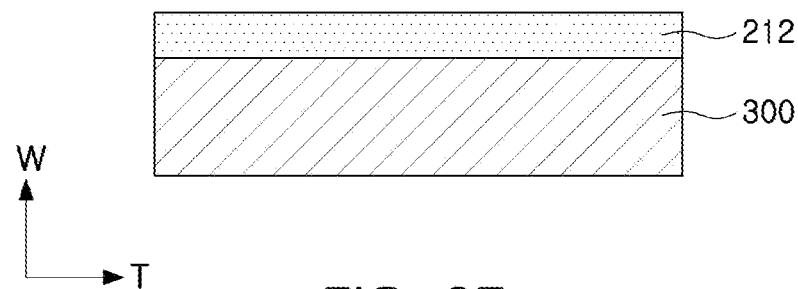

Next, as illustrated in FIG. 6E, a first side margin portion 212 and a second side margin portion (not illustrated) may be formed on the first and second side surfaces of the laminated body 210, respectively.

In detail, in a method of forming the first side margin portion 212, side ceramic green sheet 212 coated with an adhesive (not illustrated) is disposed on a punching elastic material 300 formed of rubber.

Next, the laminated body 210 is rotated 90 degrees such that the first side of the laminated body 210 faces the side ceramic green sheet 212 coated with the adhesive (not illustrated), and then, the laminated body 210 is pressed and adhered to the side ceramic green sheet 212 coated with the adhesive (not illustrated).

When the laminated body 210 is pressed and adhered to the side ceramic green sheet 212 coated with the adhesive (not illustrated) to transfer the side ceramic green sheet 212 to the laminated body 210, due to the punching elastic material 300 formed of a rubber material, the side ceramic green sheet 212 is formed up to a side edge portion of the laminated body 210, and the remaining portion may be cut.

Figure 6F:
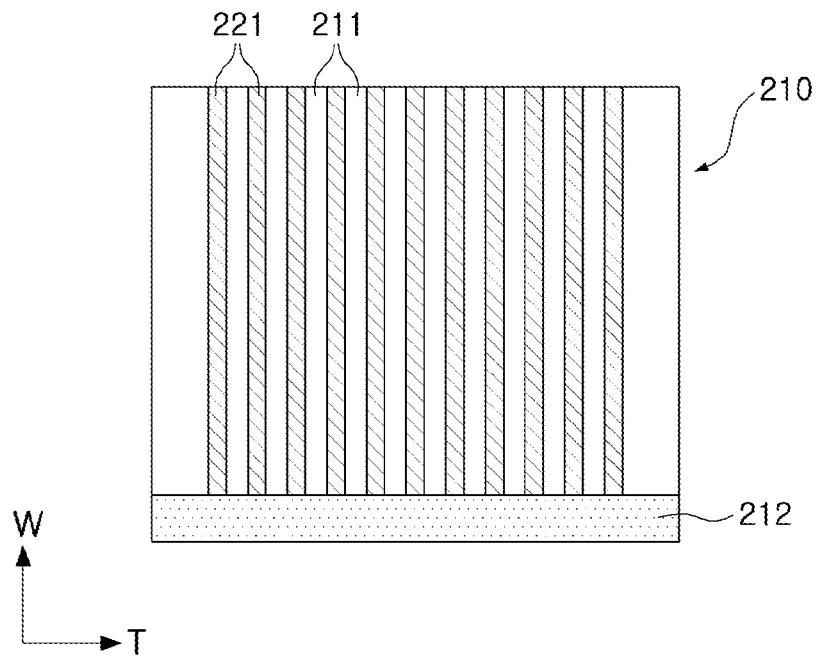

FIG. 6F illustrates that the side ceramic green sheet 212 is formed up to the side edge portion of the laminated body 210.

After that, by rotating the laminated body 210, a second side margin portion may be formed on the second side of the laminated body 210.

Next, a ceramic body including the dielectric layer and the first and second internal electrodes may be formed by calcining and firing the laminated body having the first and second side margin portions formed on both side surfaces of the multilayer body 210.

According to an exemplary embodiment of the present disclosure, since the adhesive is applied on the upper portion of the side ceramic green sheet 212, the side ceramic green sheet 212 may be transferred to the laminated body 210 under relatively low temperature and low pressure conditions, unlike the related art case.

As a result, damage to the laminated body 210 may be significantly reduced, thereby preventing deterioration of electrical characteristics of the multilayer ceramic capacitor after firing, and improving reliability.

In addition, by transferring the side ceramic green sheet 212 coated with an adhesive to the side of the laminated body 210 to then be pressed in the firing process, the adhesion between the laminated body and the ceramic green sheet may be increased.

Thereafter, an external electrode may be respectively formed on the third side surface of the ceramic body to which the first internal electrode is exposed and on the fourth side surface of the ceramic body to which the second internal electrode is exposed.

According to another exemplary embodiment, since the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110, satisfies 1.00 to 1.07, moisture resistance reliability and withstand voltage characteristics may be improved.

In addition, the description of the same parts as the features in the above-described embodiment will be omitted here to avoid duplication.

Hereinafter, an exemplary embodiment of the present disclosure will be described in more detail with reference to the experimental example, but the scope is not limited by the experimental example.

Experimental Example $BaTiO_3$ powder of 100 nm or less was used as a main component of the ceramic body, and at least one of Mn, V, Si, Al, Ba, and Dy, an organic binder, an organic solvent, a plasticizer, and a dispersant were added to the main component in a predetermined ratio, to prepare a ceramic slurry.

In preparing the slurry, zirconia balls were used as mixture/dispersion media in the main component and subcomponent powders, and mechanical milling was performed after mixing ethanol/toluene and the dispersant, and then a binder mixing process was added to implement dielectric sheet strength.

The prepared slurry was produced into a sheet having a thickness of 1.0 μm using a doctor blade-type coater. Ni internal electrode printing was performed on the formed sheet. As the printing method, methods such as screen printing, inkjet printing, and gravure printing may be used.

The upper and lower covers were manufactured by laminating a cover sheet having a thickness of 2 to 3 μm into 10 to 20 layers, and a pressed bar was produced by pressing the active sheet on which the internal electrode was printed. The pressing bar was cut into chips of 3216 (length×width× thickness: 3.2 mm×1.6 mm×1.6 mm) using a cutter.

As the base material component of the side margin portion, 100 nm or less of $BaTiO_3$ powder was used, and at least one of Mg, Ba and Si, an organic binder, an organic solvent, a plasticizer, and a dispersant were mixed in a predetermined ratio to prepare a ceramic slurry. In the same manner as the ceramic body dielectric layer, the slurry was produced, and the sheet is formed to a thickness of 10 to 20 μm to form side margin portions using an on-roll forming coater of a head discharge method.

Next, the internal electrode was exposed in the width direction of the body, and the molding sheet was attached to the electrode exposed portion of the green chip without a margin, in which the internal electrode is exposed in the width direction of the body, to then be cut to a predetermined size to form a side margin portion thereon.

A multilayer ceramic capacitor green chip of 0603 size (length×width×height: 0.6 mm×0.3 mm×0.3 mm) was fabricated by attaching the formed sheet to both sides of the chip by applying a predetermined temperature and pressure under the condition of significantly reducing chip deformation.

The multilayer ceramic capacitor specimen manufactured as described above were subjected to a calcining process at a temperature of 400° C. or lower and under nitrogen atmosphere and firing under the conditions of a firing temperature of 1200° C. or lower and a hydrogen concentration of 0.5% $H_2$ or lower, and then, the electrical characteristics, margin length, withstand voltage, and moisture resistance were comprehensively checked.

The room temperature capacitance and dielectric loss of the multilayer ceramic capacitor (MLCC) were measured at 1 kHz and 0.5 V AC using an LCR meter, and 50 samples were taken to measure the breakdown voltage (BDV) at which insulation breakdown occurred at room temperature of 25° C.

The high temperature withstand voltage refers to a voltage at which IR withstands 105Ω or more when measured at 105° C. while applying a voltage step 5V/μm for 1 hour and continuously increasing the voltage step.

In addition, the microstructures, such as margin density and length, were compared with respect to the fracture surface and the polished surface of the chip.

The number of pores in the dielectric layer and the side margin of the active portion was confirmed through measuring and counting with a scanning microscope (SEM) with a magnification of 5000 in the range area of 30 μm×30 μm after polishing the ceramic body to be ½ length in the vertical direction with respect to the surface comprised of the stacking direction (T) and the width direction (W).

Next, the moisture resistance test was performed about respective samples of an Example and a comparative example. The moisture resistance test was performed at a relative humidity of 85% and a temperature of 85° C. for 40 samples, and insulation resistance was measured while applying a rated voltage of 4V for 24 hours. At this time, when the resistance of all the samples kept $10^5 Ω$ or more during the test, it was OK, and when one or more samples were less than $10^5 Ω$, it determined with NG.

TABLE 1

| Sample | Margin portion distance/Ceramic body distance (Db/Da) | Number of pores in dielectric layer of active portion/Number of pores in side margin portion | MLCC Proto type SPL Characteristics | | | | | |
|---|---|---|---|---|---|---|---|---|
| | | | Room temperature Permittivity | DF (%) | Room temperature (25° C.) (V/μm) | High-temperature (105° C.) Withstand voltage (V/μm) | Moisture resistance load test | Characteristic Judgment |
| 1* | 0.83 | 0.7 | 2564 | 3.50 | 58 | 40 | OK | X |
| 2* | 0.85 | 0.9 | 2614 | 3.69 | 73 | 50 | OK | X |
| 3* | 0.90 | 0.9 | 2578 | 3.66 | 79 | 55 | OK | X |
| 4* | 0.97 | 0.9 | 2599 | 3.70 | 81 | 60 | OK | X |
| 5 | 1.01 | 0.9 | 2593 | 3.54 | 104 | 75 | OK | ◯ |
| 6 | 1.04 | 0.9 | 2527 | 3.61 | 106 | 75 | OK | ◯ |
| 7 | 1.07 | 1.1 | 2421 | 3.48 | 108 | 80 | OK | ◯ |
| 8* | 1.10 | 1.3 | 2401 | 3.45 | 105 | 70 | NG | X |
| 9* | 1.13 | 2.0 | 2416 | 3.46 | 94 | 65 | NG | X |
| 10* | 1.17 | 5.0 | 2399 | 3.93 | 83 | 55 | NG | X |

*Comparative Example

In the case of Comparative Examples 1 to 4, the ratio Db/Da of the distance Db between both end points of respective edge regions of the first side margin portion and the second side margin portion in the stacking direction of the ceramic body, relative to the stacking direction distance Da in a central region of the ceramic body, is 1.00 or less. In this case, the moisture resistance is satisfied, but there is a problem that the room temperature withstand voltage is lowered to 100 V/μm or less.

On the other hand, in the case of Samples 5 to 7, which is according to an exemplary embodiment of the present disclosure, the ratio Db/Da of the distance Db between both end points of respective edge regions of the first side margin portion and the second side margin portion in the stacking direction of the ceramic body, relative to the stacking direction distance Da in a central region of the ceramic body, satisfies 1.00 to 1.07. In this case, the room temperature withstand voltage of 100 V/μm or more, the high temperature withstand voltage of 70 V/μm or more, and moisture resistance load characteristics being OK, which are three characteristics according to exemplary embodiments of the present disclosure, are satisfied.

On the other hand, in the case of Comparative Example 8, the ratio Db/Da of the distance Db between both end points of respective edge regions of the first side margin portion and the second side margin portion in the stacking direction of the ceramic body, relative to the stacking direction distance Da in a central region of the ceramic body, is 1.10, which is greater than 1.07. In this case, the room temperature withstand voltage and the high temperature withstand voltage are satisfied, but the moisture resistance characteristics are not satisfied.

Further, in Comparative Examples 9 and 10, the ratio Db/Da of the distance Db between both end points of respective edge regions of the first side margin portion and the second side margin portion in the stacking direction of the ceramic body, relative to the stacking direction distance Da in a central region of the ceramic body, is greater than 1.07. In this case, the room temperature withstand voltage was 100 V/μm or less, the high temperature withstand voltage was lowered to 70 V/μm or less, and also, the moisture resistance was not satisfied.

As a result of the measurement by the experiment, it can be seen that, when the ratio Db/Da of the distance Db between both end points of respective edge regions of the first side margin portion 112 and the second side margin portion 113 in the stacking direction of the ceramic body 110, relative to the stacking direction distance Da in a central region of the ceramic body 110, satisfies 1.00 to 1.07, both moisture resistance reliability and withstand voltage characteristics may be satisfied.

As set forth above, according to an exemplary embodiment, by adjusting the ratio of the stacking direction distance in a central region of the ceramic body and the distance between both end points of respective edge regions of the first side margin portion and the second side margin portion in the stacking direction of the ceramic body, the moisture resistance reliability may be improved and the breakdown voltage may also be improved.

In addition, in the multilayer ceramic capacitor according to an exemplary embodiment, the breakdown voltage (BDV) may increase, thereby improving reliability.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer ceramic capacitor comprising:
    a ceramic body including a dielectric layer, the ceramic body having first and second surfaces opposing each other, third and fourth surfaces connecting the first and second surfaces, and fifth and sixth surfaces connected to the first to fourth surfaces and opposing each other;
    a plurality of first and second internal electrodes disposed inside the ceramic body, exposed to the first and second surfaces, and having ends exposed to the third or fourth surface; and
    a first side margin portion and a second side margin portion disposed on side portions of the plurality of first and second internal electrodes exposed to the first and second surfaces, respectively,
    wherein a ratio Db/Da is greater than 1.00 and less than or equal to 1.07, where 'Db' is a distance, in a stacking direction of the dielectric layer, between both end points of respective edge regions of the first side margin portion and the second side margin portion, and 'Da' is a distance in a central region of the ceramic body in the stacking direction, and
    wherein at least one of the first side margin portion or the second side margin portion includes at least a portion having a length in the stacking direction which decreases in a direction perpendicular to the stacking direction toward the central region.

2. The multilayer ceramic capacitor of claim 1, wherein the ceramic body comprises an active portion including a plurality of internal electrodes disposed to face each other with the dielectric layer interposed therebetween to form capacitance, and a cover portion disposed on upper and lower portions of the active portion in the stacking direction, and
    a ratio of a number of pores in the first and second side margin portions to a number of pores in the dielectric layer of the active portion satisfies 0.9 to 1.1.

3. The multilayer ceramic capacitor of claim 1, wherein a thickness of the dielectric layer is 0.6 μm or less, and a thickness of each of the plurality of first and second internal electrodes is 0.4 μm or less.

4. The multilayer ceramic capacitor of claim 1, wherein a ratio d2/d1 is greater than 1.00 and 1.05 or less, where 'd2' is an interval between the first internal electrode and the second internal electrode on an end portion of the ceramic body adjacent to the first or second side margin portion, and 'd1' is an interval between the first internal electrode and the second internal electrode in a central region of the ceramic body.

5. A method of manufacturing a multilayer ceramic capacitor, comprising:
    preparing a first ceramic green sheet on which a plurality of first internal electrode patterns are formed at a predetermined interval and a second ceramic green sheet on which a plurality of second internal electrode patterns are formed at a predetermined interval;
    laminating the first ceramic green sheet and the second ceramic green sheet in such a manner that the plurality of first internal electrode patterns and the plurality of second internal electrode patterns intersect each other, to form a ceramic green sheet laminated body;
    cutting the ceramic green sheet laminated body to have side surfaces to which edges of the plurality of first internal electrode patterns and the plurality of second internal electrode patterns are exposed in a width direction;
    forming a first side margin portion and a second side margin portion on the side surfaces of the laminated body, respectively; and
    firing the cut laminated body to provide a ceramic body including a dielectric layer and first and second internal electrodes,
    wherein a ratio Db/Da is greater than 1.00 and less than or equal to 1.07, where 'Db' is a distance, in a stacking direction of the first and second ceramic green sheets, between both end points of respective edge regions of the first side margin portion and the second side margin portion, and 'Da' is a distance in a central region of the ceramic body in the stacking direction, and
    wherein at least one of the first side margin portion or the second side margin portion includes at least a portion having a length in the stacking direction which decreases in a direction perpendicular to the stacking direction toward the central region.

6. The method of claim 5, wherein a thickness of each of the first and second ceramic green sheets is 1.0 μm or less, and a thickness of each of the first and second internal electrode patterns is 0.5 µm or less.

7. The method of claim 5, wherein the ceramic body comprises an active portion including a plurality of first and second internal electrodes disposed to face each other with the dielectric layer interposed therebetween to form capacitance, and a cover portion disposed on upper and lower portions of the active portion in the stacking direction, and
    a ratio of a number of pores in the first and second side margin portions to a number of pores in the dielectric layer of the active portion satisfies 0.9 to 1.1.

8. The method of claim 7, wherein a ratio d2/d1 is greater than 1.00 and less than or equal to 1.05, where 'd2' is an interval between the first internal electrode and the second internal electrode on an end portion of the ceramic body adjacent to the first and second side margin portions, and 'd1' is an interval between the first internal electrode and the second internal electrode in a central region of the ceramic body.

9. The method of claim 5, wherein the ratio Db/Da is greater than 1.00 and less than or equal to 1.07.

* * * * *